(12) United States Patent
Lee et al.

(10) Patent No.: US 12,395,211 B1
(45) Date of Patent: Aug. 19, 2025

(54) RB/PRG-LEVEL PRECODER CYCLING BASED ON VIRTUAL DMRS PORTS

(71) Applicant: QUALCOMM Incorporated, San Diego, CA (US)

(72) Inventors: Hyojin Lee, San Diego, CA (US); Jing Jiang, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 18/444,436

(22) Filed: Feb. 16, 2024

(51) Int. Cl.
*H04W 72/23* (2023.01)
*H04B 7/0456* (2017.01)
(Continued)

(52) U.S. Cl.
CPC ......... *H04B 7/0456* (2013.01); *H04L 5/0048* (2013.01); *H04W 72/30* (2023.01)

(58) Field of Classification Search
CPC ............. H04W 72/23; H04W 72/0446; H04W 72/232; H04W 72/044; H04W 88/02; H04W 52/242; H04W 88/08; H04W 72/51; H04W 72/04; H04W 72/20; H04W 72/1268; H04W 72/0453; H04L 5/0023; H04L 5/0053; H04L 5/0051; H04L 5/0048; H04L 1/0003; H04L 5/001; H04L 1/0009; H04L 25/03343; H04L 1/1861; H04L 1/1854; H04L 5/0055; H04L 1/1896; H04B 7/0456; H04B 7/0404; H04B 7/0617; H04B 7/0417; H04B 7/0413; H04B 7/0623; H04B 7/0639; H04B 7/0626; H04B 7/0452;
(Continued)

(56) References Cited

U.S. PATENT DOCUMENTS 9,264,191 B2 * 2/2016 Ellenbeck .............. H04B 15/00
10,484,223 B2 * 11/2019 Hessler .................. H04L 5/001
(Continued)

OTHER PUBLICATIONS

International Search Report and Written Opinion—PCT/US2024/062012—ISA/EPO—Mar. 31, 2025.
(Continued)

*Primary Examiner* — Eva Y Puente
(74) *Attorney, Agent, or Firm* — Arent Fox LLP

(57) ABSTRACT

This disclosure provides systems, methods and apparatuses for transmissions with non-transparent precoder cycling. A network node generates a precoding matrix including a number of sub-matrices equal to a number of antenna groups. A first sub-matrix for a first antenna group is the same for each frequency domain resource unit of a frequency domain resource group. A phase of each subsequent sub-matrix for each subsequent antenna group is shifted to be orthogonal for each frequency domain resource unit. The network node applies the precoding matrix to both a data signal and a demodulation reference signal (DMRS) of a transmission for each frequency domain resource unit of the frequency domain resource group and transmits the precoded transmission via the antenna groups. A UE receives the transmission having non-transparent precoder cycling, estimates a channel of the transmission based on the precoding matrix, and demodulates the data signal based on the estimated channel.

30 Claims, 10 Drawing Sheets

(51) Int. Cl.
*H04L 5/00* (2006.01)
*H04W 72/30* (2023.01)

(58) Field of Classification Search
CPC .. H04B 7/0697; H04B 7/0619; H04B 7/0634; H04B 7/0486
See application file for complete search history.

(56) References Cited

U.S. PATENT DOCUMENTS

| | | | |
|---|---|---|---|
| 2016/0212643 A1* | 7/2016 | Park | H04B 7/0478 |
| 2019/0357159 A1 | 11/2019 | Pan et al. | |
| 2021/0152303 A1 | 5/2021 | Hao et al. | |
| 2021/0337428 A1* | 10/2021 | Li | H04W 72/0446 |
| 2021/0376890 A1* | 12/2021 | Levy | H04B 7/0456 |
| 2022/0321180 A1* | 10/2022 | Huang | H04L 25/03343 |
| 2023/0318775 A1 | 10/2023 | Ferdinand et al. | |
| 2023/0353315 A1* | 11/2023 | Abdelghaffar | H04L 27/2613 |
| 2024/0349323 A1* | 10/2024 | Landis | H04L 5/0048 |

OTHER PUBLICATIONS

Qualcomm Incorporated: "On UL Diversity Transmission Scheme", 3GPP Draft, 3GPP TSG RAN WG1 Meeting NR#3, R1-1716390, 3rd Generation Partnership Project, Mobile Competence Centre, 650, Route Des Lucioles, F-06921 Sophia-Antipolis Cedex, France, vol. Ran WG1, No. Nagoya, Japan, Sep. 18, 2017-Sep. 21, 2017, Sep. 12, 2017, XP051329979, pp. 1-20, The Whole Document.

* cited by examiner

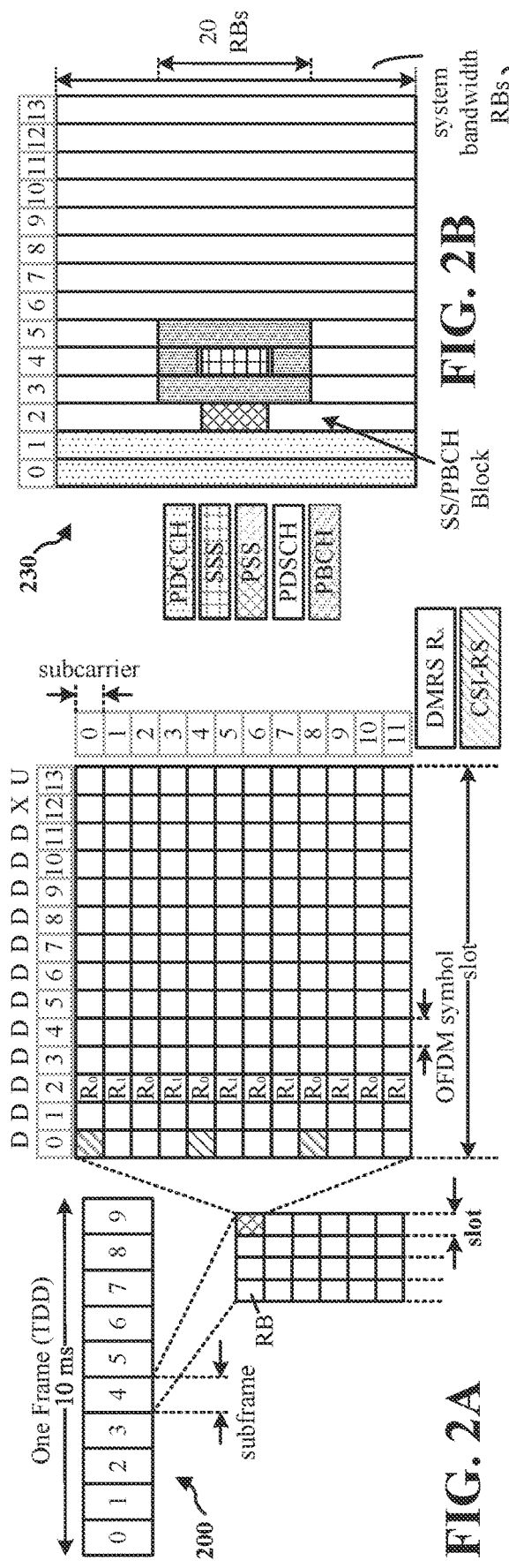
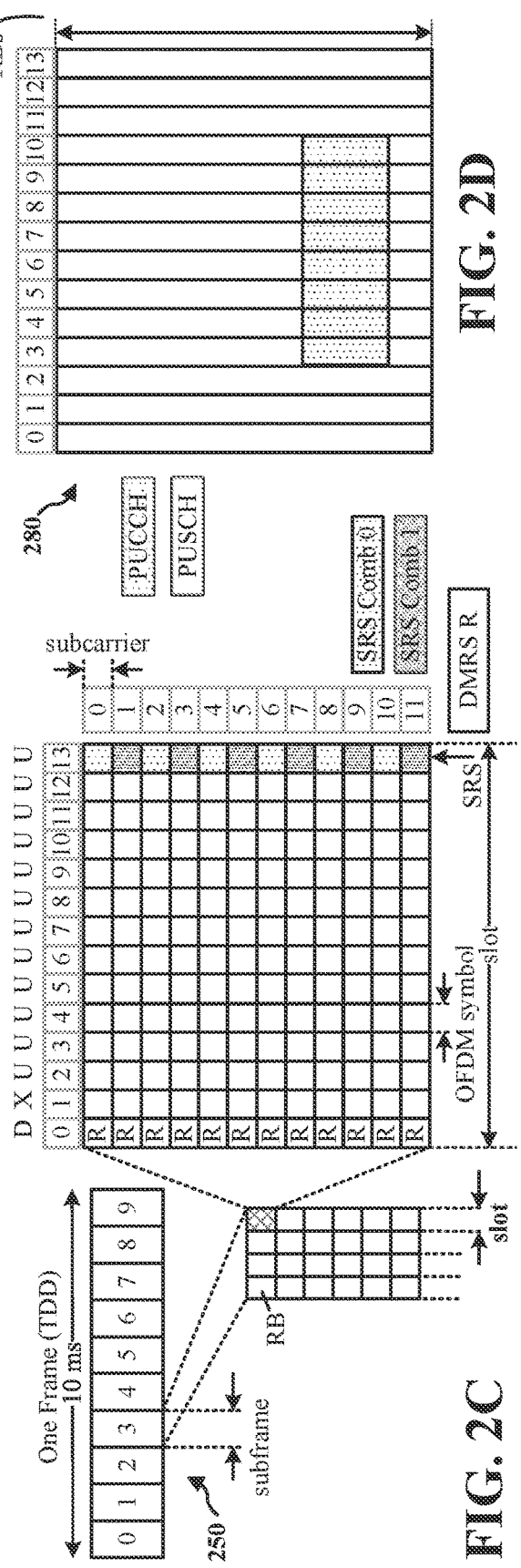
FIG. 2A
FIG. 2B
FIG. 2C
FIG. 2D

RB/PRG-LEVEL PRECODER CYCLING BASED ON VIRTUAL DMRS PORTS

TECHNICAL FIELD

The present disclosure relates to wireless communications including resource block (RB) and physical resource group (PRG) level precoder cycling based on virtual demodulation reference signal (DMRS) ports.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

SUMMARY

The systems, methods and devices of this disclosure each have several innovative aspects, no single one of which is solely responsible for the desirable attributes disclosed herein.

In some aspects, the techniques described herein relate to an apparatus for wireless communication at a user equipment (UE), including: one or more memories storing computer-executable instructions; and one or more processors coupled with the one or more memories and configured to execute the computer-executable instructions, individually or in combination, to cause the apparatus to: receive a transmission having non-transparent precoder cycling applied to each frequency domain resource unit of a frequency domain resource group of K frequency domain resource units in which both a data signal and a demodulation reference signal (DMRS) are precoded with a precoding matrix including a number of sub-matrices equal to a number of antenna groups, wherein a first sub-matrix for a first antenna group is the same for each frequency domain resource unit and a phase of each subsequent sub-matrix for each subsequent antenna group is shifted to be orthogonal across the frequency domain resource units of the frequency domain resource group; estimate a channel of the transmission based on the precoding matrix; and demodulate the data signal based on the estimated channel.

In some aspects, the techniques described herein relate to a method of wireless communication at a user equipment (UE), including: receiving a transmission having non-transparent precoder cycling applied to each frequency domain resource unit of a frequency domain resource group of K frequency domain resource units in which both a data signal and a demodulation reference signal (DMRS) are precoded with a precoding matrix including a number of sub-matrices equal to a number of antenna groups, wherein a first sub-matrix for a first antenna group is the same for each frequency domain resource unit and a phase of each subsequent sub-matrix for each subsequent antenna group is shifted to be orthogonal across the frequency domain resource units of the frequency domain resource group; estimating a channel of the transmission based on the precoding matrix; and demodulating the data signal based on the estimated channel.

The present disclosure also provides an apparatus (e.g., a UE) including means for performing at least one of the above methods, and a non-transitory computer-readable medium storing computer-executable instructions for performing at least one of the above methods.

In some aspects, the techniques described herein relate to an apparatus for wireless communication, including: one or more memories storing computer-executable instructions; and one or more processors coupled with the one or more memories and configured to execute the computer-executable instructions, individually or in combination, to cause the apparatus to: generate a precoding matrix including a number of sub-matrices equal to a number of antenna groups, wherein a first sub-matrix for a first antenna group is the same for each frequency domain resource unit of a frequency domain resource group of K frequency domain resource units, and wherein a phase of each subsequent sub-matrix for each subsequent antenna group is shifted to be orthogonal for each frequency domain resource unit of the frequency domain resource group; apply the precoding matrix to both a data signal and a demodulation reference signal (DMRS) of a transmission for each frequency domain resource unit of the frequency domain resource group for non-transparent precoder cycling; and transmit the precoded transmission via the antenna groups.

In some aspects, the techniques described herein relate to a method of wireless communication at a network node, including: generating a precoding matrix including a number of sub-matrices equal to a number of antenna groups, wherein a first sub-matrix for a first antenna group is the same for each frequency domain resource unit of a frequency domain resource group of K frequency domain resource units, and wherein a phase of each subsequent sub-matrix for each subsequent antenna group is shifted to be orthogonal for each frequency domain resource unit of the frequency domain resource group; applying the precoding matrix to both a data signal and a demodulation reference signal (DMRS) of a transmission for each frequency domain resource unit of the frequency domain resource group for non-transparent precoder cycling; and transmitting the precoded transmission via the antenna groups.

The present disclosure also provides an apparatus (e.g., a BS) including means for performing at least one of the above methods, and a non-transitory computer-readable medium storing computer-executable instructions for performing at least one of the above methods.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 2A is a diagram illustrating an example of a first frame.

FIG. 2B is a diagram illustrating an example of DL channels within a subframe.

FIG. 2C is a diagram illustrating an example of a second frame.

FIG. 2D is a diagram illustrating an example of a subframe.

Like reference numbers and designations in the various drawings indicate like elements.

DETAILED DESCRIPTION

Figure 1:
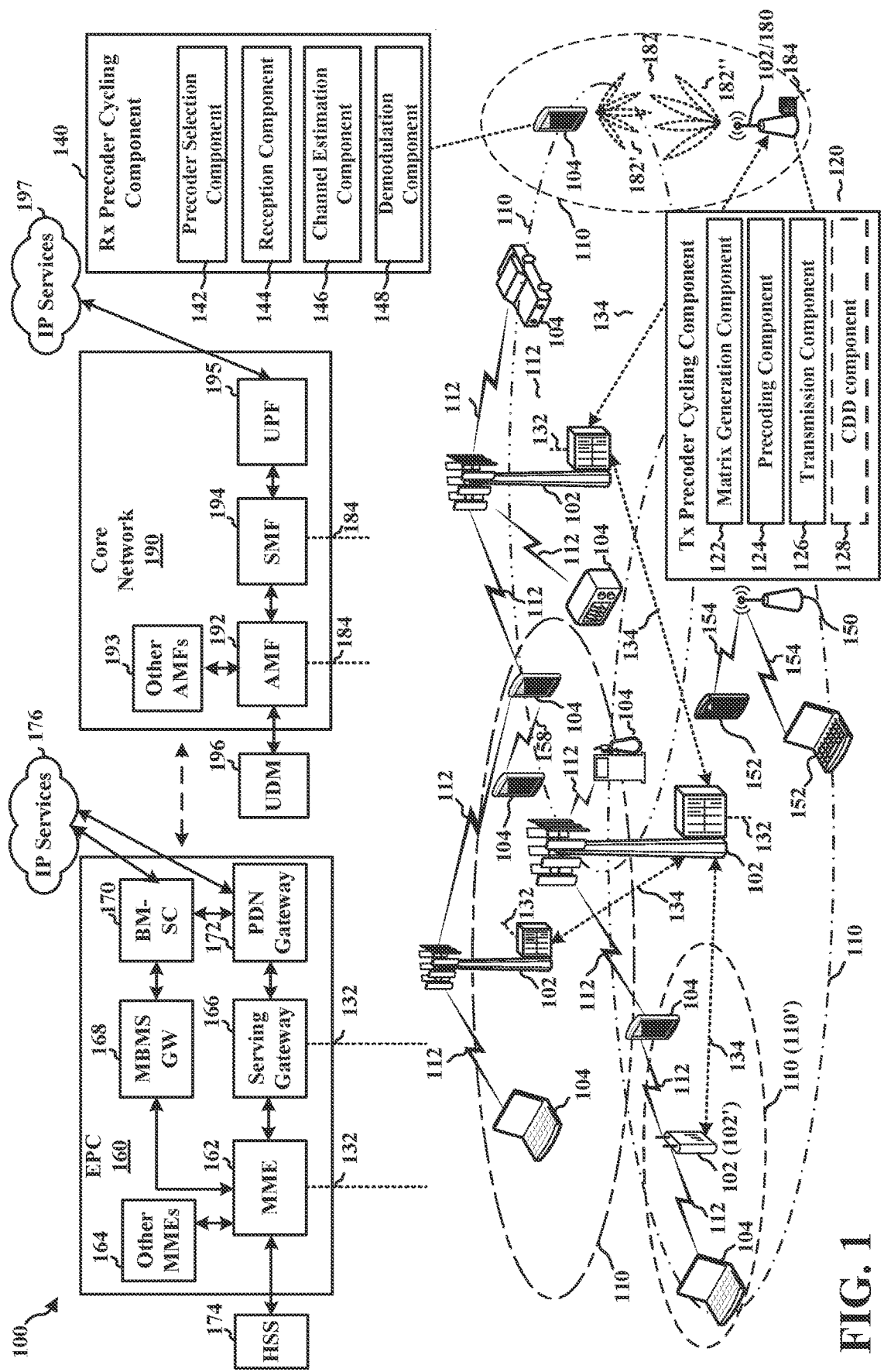
FIG. 1 is a diagram illustrating an example of a wireless communications system including an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G or 5G, or further implementations thereof, technology.

In a wireless communications network such as a 5G NR network, a diversity scheme improves reliability of a message signal by using two or more communication channels with different characteristics. The channels may be at least partly independent such that multiple versions of the same signal may be transmitted and/or received and combined in the receiver. Problems that affect one channel may be averaged out to improve reliability. In the case of multiple-input multiple-output (MIMO) using multiple antennas or groups of antennas, a precoder may achieve spatial diversity, which may be used with other types of diversity. In open-loop MIMO, feedback from a receiver may be unavailable to assist with precoder selection. Features of an efficient open loop diversity scheme include good performance, small demodulation reference signal (DMRS) overhead, and a transmission scheme consistent with DMRS transmission.

A space-frequency block code (SFBC) is an example diversity scheme for 2-port MIMO using 2 DMRS ports. The two ports may apply to different pols, panels, or beams. SFBC transmission, however, may be inefficient due to the requirement of two antenna ports for a single layer transmission, which has lower spectral efficiency than multi-layer transmissions. Further, multiple transmission schemes for the same channel may complicate UE implementation and limit interference aware advanced reception techniques.

An open-loop MIMO technique used in, for example, 5G NR networks is PRG level precoder cycling for a physical downlink shared channel. Resource blocks (RBs) may be bundled in groups of 2, 4, or wideband (i.e., all RBs). A different precoder may be applied to each PRG. A large bundling size requires a large number of RBs for cycling, while a small bundling size degrades channel estimation performance. Thus, there is a tradeoff between diversity gain and channel estimation performance.

Other diversity schemes utilize cyclic delay diversity (CDD), where a different delay is introduced on each antenna port. Small delay CDD utilizes delays less than a cyclic prefix for a symbol. Small delay CDD may be equivalent to resource element (RE) level precoder cycling. Large delay CDD may utilize a DMRS port per rank (R). Each R-port DMRS resource may be precoded by a precoder per sub-array(S). DMRS bundling can be applied at an PRG level while non-transparent precoding is applied at an RE or RB level. This scheme allows high resolution RE or RB level precoding cycling for greater diversity while allowing DMRS bundling size to be kept at PRG level for greater channel estimation performance. However, this scheme uses S×R DMRS ports and the data transmission scheme is not consistent with DMRS transmission, resulting in greater complexity.

In an aspect, the present disclosure provides a diversity scheme using non-transparent RB or PRG level precoder cycling based on virtual DMRS ports. A frequency domain resource unit may refer to a level at which precoder cycling is applied. For example, the frequency domain resource unit may be a RB or a PRG. A frequency domain resource group may refer to a number of frequency domain resource units over which the precoder cycling occurs. In an example where the frequency domain resource unit is an RB, the frequency domain resource group may be a PRG with a bundling size of 2 or 4. In another example, where the frequency domain resource group is a PRG, the frequency domain resource group may be a group of PRGs with a bundling size of 2 or 4. A virtual DMRS port may refer to a port corresponding to an antenna group. For example, one virtual DMRS port may provide an R-port DMRS by applying a 1×R sub-matrix corresponding to the antenna group to the DMRS sequence.

The diversity scheme utilizes a precoding matrix that is applied to both the data and the DMRS. The precoding matrix includes a number of sub-matrices equal to a number of antenna groups. The precoding matrix is a $N_t \times R$ precoding matrix, where $N_t$ is the total number of transmit antennas. The first sub-matrix (e.g., $W_0$) for a first antenna group is the same for each frequency domain unit. The phase of each subsequent sub-matrix for each subsequent antenna group is shifted to be orthogonal across the frequency domain resource units of the frequency domain resource group. For each frequency domain resource unit, the actual R-port DMRS to data signal mapping is the identity matrix ($I_R$). For each frequency domain resource group, non-transparent precoding matrix $$\begin{bmatrix} I_R \\ e^{\frac{j2\pi \cdot [k]_K}{K}} I_R \end{bmatrix}$$

is applied on 2R-port virtual DMRS.

At a receiving device (e.g., a UE), two different DMRS channel estimation and demodulation options are available. In a first option, the DMRS channel estimation is performed per frequency domain resource unit without assuming precoder bundling at a frequency domain resource group level. For interference channel estimation, the same frequency domain resource unit level DMRS estimation is performed. In the second option, a virtual DMRS channel at the frequency domain resource group level may be used for DMRS channel estimation. A per frequency domain resource unit level channel may be calculated based on the non-transparent precoding matrix and the virtual DMRS channel. The data signal may be estimated from the per frequency domain resource unit level channel.

In an aspect, the non-transparent precoder cycling described herein provides a diversity scheme suitable for open-loop MIMO transmissions. As used herein, non-transparent precoder cycling refers to the transmitting device applying different precoders to frequency domain resources units of a transmission in a cycle that is known to the receiving device (i.e., non-transparent). The number of actual DMRS ports is not increased, while non-transparent precoder cycling is applied to provide diversity. From the perspective of a UE, virtual DMRS ports allow wideband (PRG level or group of PRG level) DMRS channel estimation to be performed. At the RB or PRG-level, the transmission scheme is consistent with DMRS ports, reducing complexity. Further, there are multiple receiver implementation options available for non-transparent precoder cycling.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. The processor may include an interface or be coupled to an interface that can obtain or output signals. The processor may obtain signals via the interface and output signals via the interface. In some implementations, the interface may be a printed circuit board (PCB) transmission line. In some other implementations, the interface may include a wireless transmitter, a wireless transceiver, or a combination thereof. For example, the interface may include a radio frequency (RF) transceiver which can be implemented to receive or transmit signals, or both. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells. The small cells include femtocells, picocells, and microcells. The base stations 102 can be configured in a Disaggregated RAN (D-RAN) or Open RAN (O-RAN) architecture, where functionality is split between multiple units such as a central unit (CU), one or more distributed units (DUs), or a radio unit (RU). Such architectures may be configured to utilize a protocol stack that is logically split between one or more units (such as one or more CUs and one or more DUs). In some aspects, the CUs may be implemented within an edge RAN node, and in some aspects, one or more DUs may be co-located with a CU, or may be geographically distributed throughout one or multiple RAN nodes. The DUs may be implemented to communicate with one or more RUs.

In some implementations, one or more of the UEs 104 includes a Rx precoder cycling component 140 configured to receive open loop MIMO transmissions with non-transparent precoder cycling. The Rx precoder cycling component 140 includes a precoder selection component 142, a reception component 144, a channel estimation component 146, and a demodulation component 148. The precoder selection component 142 is configured to select a precoding matrix comprising a number of sub-matrices equal to a number of antenna groups. A first sub-matrix for a first antenna group is the same for each frequency domain resource unit and a phase of each subsequent sub-matrix for each subsequent antenna group is shifted to be orthogonal across the frequency domain resource units of the frequency domain resource group. The reception component 144 is configured to receive a transmission having non-transparent precoder cycling applied to each frequency domain resource unit of a frequency domain resource group of K frequency domain resource units in which both a data signal and a demodulation reference signal (DMRS) are precoded with the precoding matrix. The channel estimation component 146 is configured to estimate a channel of the transmission based on the precoding matrix. The demodulation component 148 is configured to demodulate the data signal based on the estimated channel.

In some implementations, one or more of the base stations 102 includes a Tx precoder cycling component 120 configured to transmit open loop MIMO transmissions with non-transparent precoder cycling. The Tx precoder cycling component 120 includes a matrix generation component 122, a precoding component 124, and a transmission component 126. The Tx precoder cycling component 120 may optionally include a cyclic delay diversity (CDD) component 128. The matrix generation component 122 is configured to generate a precoding matrix including a number of sub-matrices equal to a number of antenna groups. A first sub-matrix for a first antenna group is the same for each frequency domain resource unit of a frequency domain resource group of K frequency domain resource units, and a phase of each subsequent sub-matrix for each subsequent antenna group is shifted to be orthogonal for each frequency domain resource unit of the frequency domain resource group. The precoding component 124 is configured to apply the precoding matrix to both a data signal and a demodulation reference signal (DMRS) of a transmission for each frequency domain resource unit of the frequency domain resource group for non-transparent precoder cycling. The transmission component 126 is configured to transmit the precoded transmission via the antenna groups. The CDD component 128 is configured to precode the data signal with small delay cyclic delay diversity prior to precoding at a PRG-level with the precoding matrix.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (such as S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over third backhaul links 134 (such as X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 112 between the base stations 102 and the UEs 104 may include UL (also referred to as reverse link) transmissions from a UE 104 to a base station 102 or DL (also referred to as forward link) transmissions from a base station 102 to a UE 104. The communication links 112 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHZ) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "Sub-6 GHZ" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHZ-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as a MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

FIG. 2A is a diagram 200 illustrating an example of a first frame. FIG. 2B is a diagram 230 illustrating an example of DL channels within a subframe. FIG. 2C is a diagram 250 illustrating an example of a second frame. FIG. 2D is a diagram 280 illustrating an example of a subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. A subset of the total cell bandwidth of a cell is referred to as a Bandwidth Part (BWP) and bandwidth adaptation is achieved by configuring the UE with BWP(s) and telling the UE which of the configured BWPs is currently the active one. In an aspect, a narrow bandwidth part (NBWP) refers to a BWP having a bandwidth less than or equal to a maximum configurable bandwidth of a BWP. The bandwidth of the NBWP is less than the carrier system bandwidth.

In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure or different channels. A frame (10 milliseconds (ms)) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 24 slots/subframe. The subcarrier spacing and symbol length/duration are a function of the numerology. The subcarrier spacing may be equal to $2^\mu*15$ kHz, where u is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 microseconds ($\mu$s).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DMRS) (indicated as Rx for one particular configuration, where 100x is the port number, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a L1 identity. A secondary synchronization signal (SSS) may be within symbol 4 of particular subframes of a frame. The SSS is used by a UE to determine a L1 cell identity group number and radio frame timing. Based on the L1 identity and the L1 cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
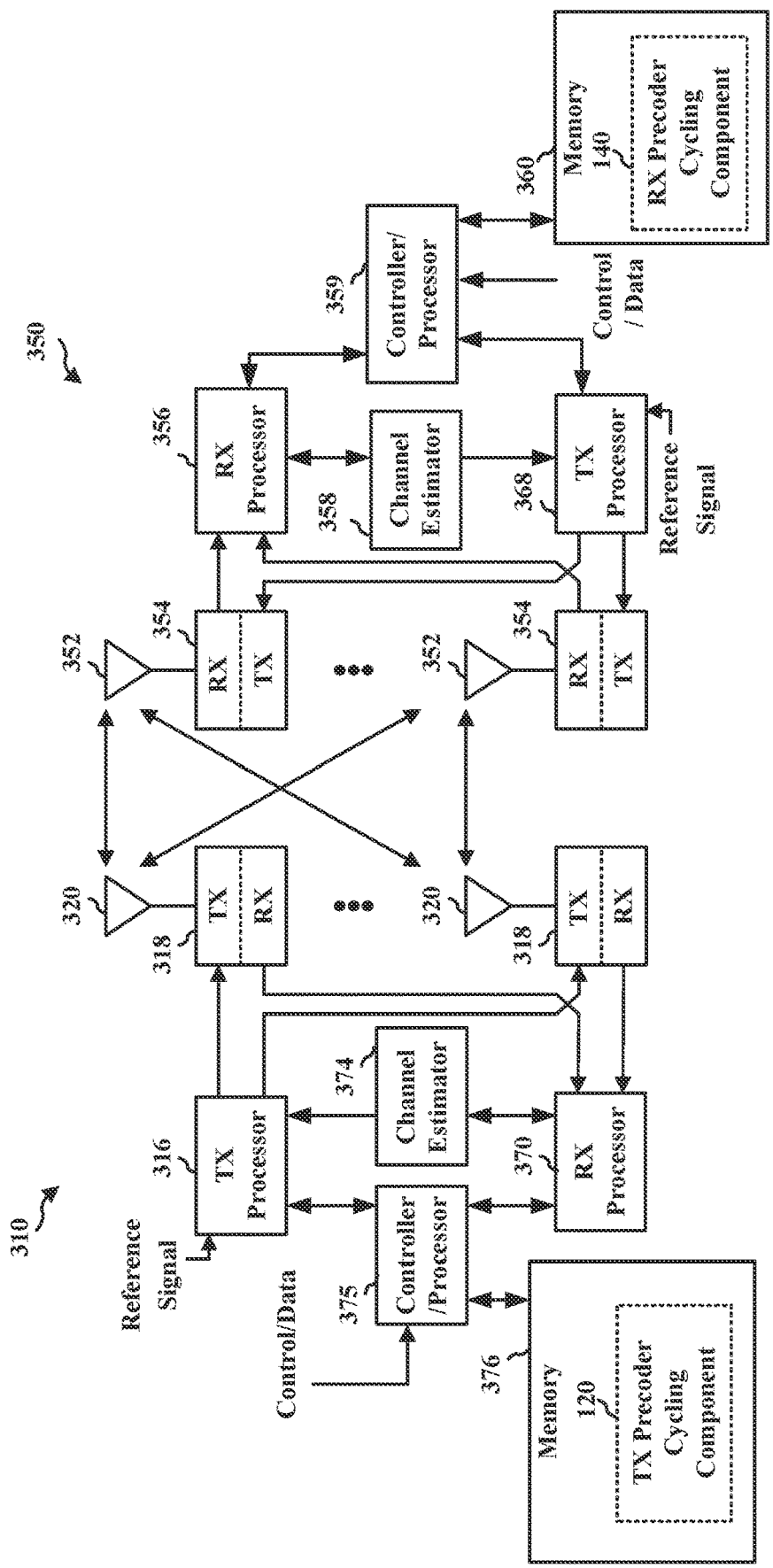
FIG. 3 is a diagram illustrating an example of a base station (BS) and user equipment (UE) in an access network.

FIG. 3 is a diagram of an example of a base station 310 and a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as a pilot) in the time or frequency domain, and combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are decoded and deinterleaved to recover the data and control signals that were originally transmitted by the base station 310 on the physical channel. The data and control signals are provided to the controller/processor 359, which implements layer 3 and layer 2 functionality.

The controller/processor 359 can be associated with a memory 360 that stores program codes and data. The memory 360 may be referred to as a computer-readable medium and may be any of the types of computer-readable mediums discussed herein (e.g., RAM, ROM, EEPROM, optical disk storage, magnetic disk storage, other magnetic storage devices, combinations of the aforementioned types of computer-readable media, or any other medium that can be used to store computer executable code in the form of instructions or data structures that can be accessed by a computer). In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium and may be any of the types of computer-readable mediums discussed herein (e.g., RAM, ROM, EEPROM, optical disk storage, magnetic disk storage, other magnetic storage devices, combinations of the aforementioned types of computer-readable media, or any other medium that can be used to store computer executable code in the form of instructions or data structures that can be accessed by a computer). In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the Rx precoder cycling component 140 of FIG. 1. For example, the memory 360 may include executable instructions defining the Rx precoder cycling component 140. The TX processor 368, the RX processor 356, and/or the controller/processor 359 may be configured to execute the Rx precoder cycling component 140.

At least one of the TX processor 316, the RX processor 370, and the controller/processor 375 may be configured to perform aspects in connection with the Tx precoder cycling component 120 of FIG. 1. For example, the memory 376 may include executable instructions defining the Tx precoder cycling component 120. The TX processor 316, the RX processor 370, and/or the controller/processor 375 may be configured to execute the Tx precoder cycling component 120.

Figure 4:
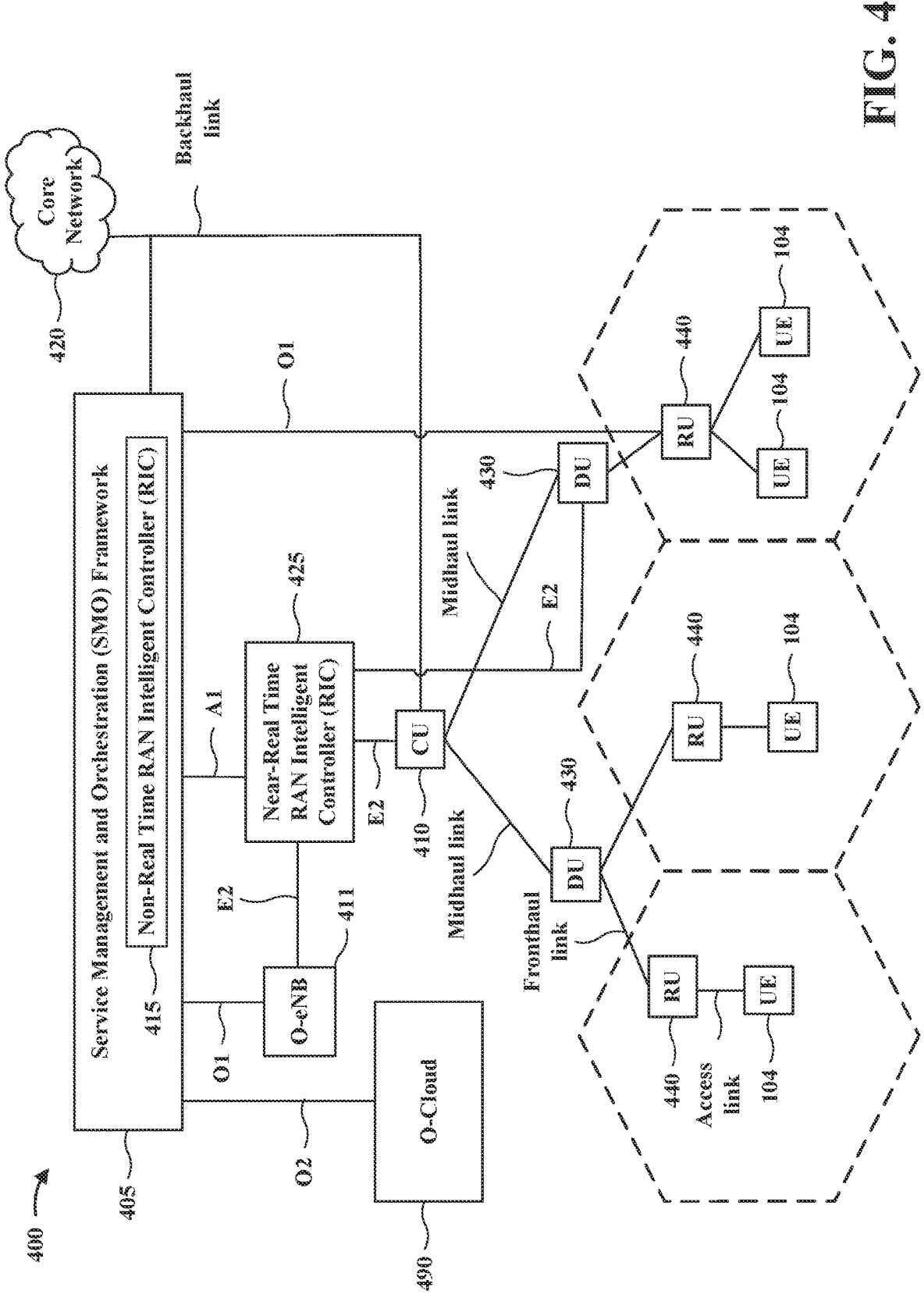
FIG. 4 is a diagram illustrating an example disaggregated base station architecture.

FIG. 4 is a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

Figure 5:
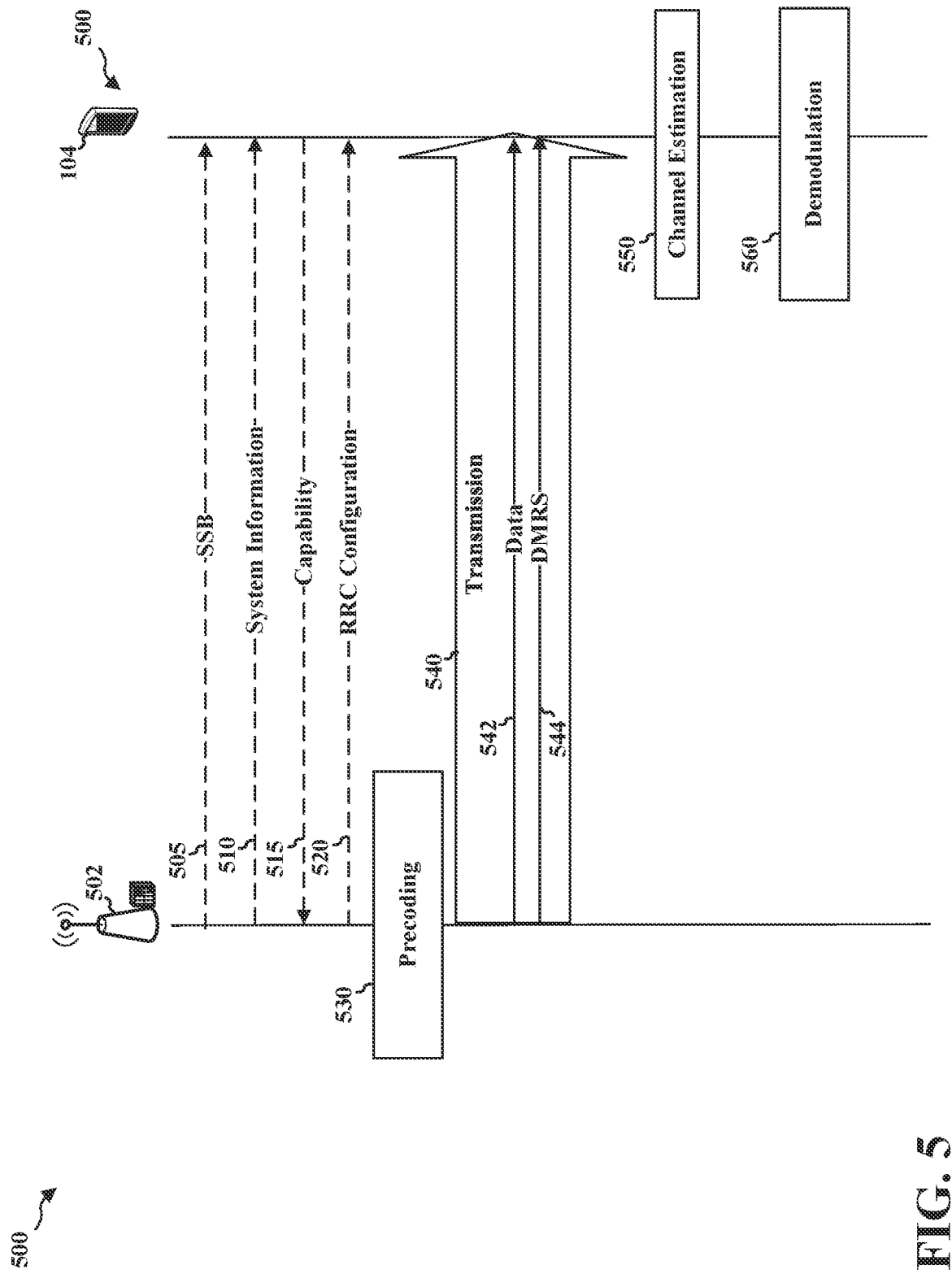
FIG. 5 is a message diagram illustrating various messages and actions for non-transparent precoder cycling.

FIG. 5 is a message diagram 500 illustrating various messages for open loop MIMO with precoder cycling. The UE 104 may be in communication with one or more base stations 502. The base station 502 may provide a primary cell and/or secondary cells.

In an aspect, open loop MIMO may be used for broadcast data and control channels, and for communications before an RRC connection is established or as fallback in case of unreliable channel state information feedback. Accordingly, open loop MIMO may operate with minimal signaling.

A base station 502 may transmit a synchronization signal block (SSB) 505. The SSB 505 may include a primary synchronization signal (PSS), a secondary synchronization signal (SSS), and a physical broadcast channel (PBCH). The PBCH may carry some information for the cell provided by the base station 502. For example, the PBCH may indicate a location for system information 510. The base station 502 may transmit the system information 510. The system information 510 may include parameters for open loop MIMO transmissions. For example, the system information 510 may indicate a number of antenna groups and a number of layers for various channels.

In some implementations, the UE 104 may transmit a capability message 515 that indicates a capability of the UE with respect to precoder cycling. For example, the capability message 515 may indicate a capability for RB level or PRG level precoder cycling.

In some implementations, the base station 502 may transmit an RRC configuration 520. The RRC configuration 520 may indicate non-transparent precoder cycling parameters such as a frequency domain resource unit size or a frequency domain resource group size (K). The RRC configuration 520 may also configure a number of antenna groups.

The base station 502 may perform precoding 530 using non-transparent precoder cycling. For example, the base station 502 may generate a precoding matrix and apply the precoding matrix to both a data signal and a DMRS of a transmission 540. For instance, the transmission 540 may be one of a broadcast data transmission, a control channel, a transmission prior to radio resource control connection establishment, or a fallback transmission. The base station 502 transmits the precoded transmission 540 (e.g., PDSCH) via the antenna groups.

The UE 104 receives the transmission 540 and performs channel estimation 550 based on the precoding matrix. For example, the channel estimation may be per frequency domain resource unit or per virtual DMRS channel. The UE 104 performs demodulation 560 of the transmission 540 based on the channel estimates.

Figure 6A:
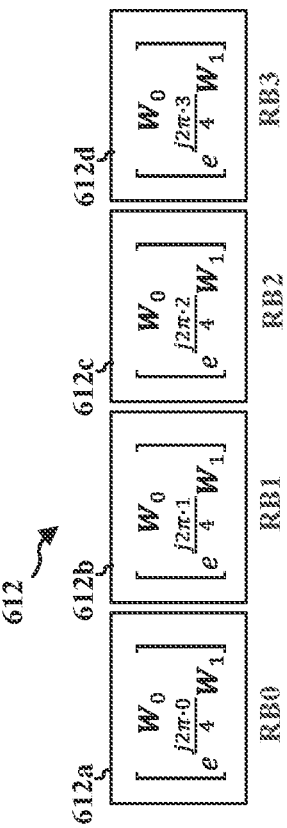
FIG. 6A is a diagram of a first set of precoding matrices for non-transparent precoder cycling for two antenna groups.

FIG. 6A is a diagram of a first set 600 of precoding matrices 602 (e.g., 602a and 602b) for non-transparent precoder cycling for two antenna groups, where the size of each precoding matrix is $N_t \times R$ and $N_t$ is the number of transmit antennas of the base station 502. Each precoding matrix 602 in the first set 600 includes two sub-matrices corresponding to two antenna groups. A first sub-matrix ($W_0$) for a first antenna group is the same for each frequency domain resource unit (e.g., RB0 and RB1) of a frequency domain resource group of K (e.g., K=2) frequency domain resource units. That is, each precoding matrix 602 includes a same first sub-matrix $W_0$. A phase of each subsequent $$\left(\text{e.g., by } e^{\frac{j2\pi \cdot [k]_K}{K}}\right)$$

sub-matrix ($W_1$) for each subsequent antenna group is shifted to be orthogonal for each frequency domain resource unit of the frequency domain resource group. The term k is an index of a frequency domain resource unit and $[k]_K$ is an index of the frequency domain resource unit within the frequency domain resource group (e.g., k mod K). Each sub-matrix $W_i$ may be a $(N_t/2) \times R$ matrix.

Figure 6B:
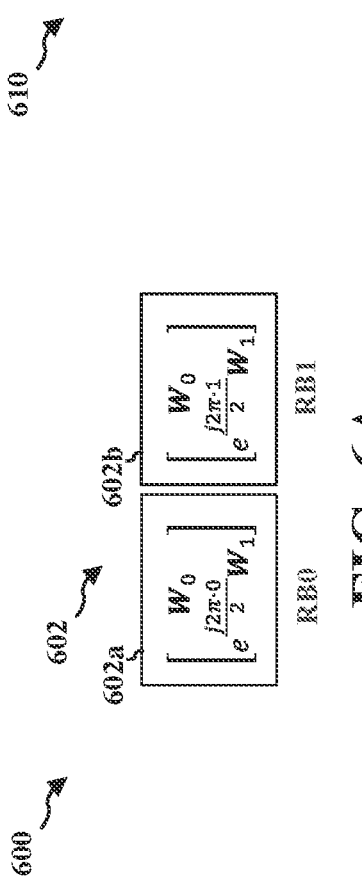
FIG. 6B is a diagram of a second set of precoding matrices for non-transparent precoder cycling for two antenna groups with a frequency domain resource group size of 4.

FIG. 6B is a diagram of a second set 610 of precoding matrices 612 (e.g., 612a, 612b, 612c, 612d) for non-transparent precoder cycling for two antenna groups with a frequency domain resource group size of 4. Each precoding matrix 612 in the second set 610 includes two sub-matrices corresponding to two antenna groups. A first sub-matrix ($W_0$) for a first antenna group is the same for each frequency domain resource unit (e.g., RB) of a frequency domain resource group of K (e.g., K=4) frequency domain resource units. A phase of each subsequent sub-matrix ($W_1$) for each subsequent antenna group is shifted $$\left(\text{e.g., by } e^{\frac{j2\pi \cdot [k]_K}{K}}\right)$$

to be orthogonal for each frequency domain resource unit of the frequency domain resource group. The term k is an index of a frequency domain resource unit and [k] is an index of the frequency domain resource unit within the frequency domain resource group (e.g., k mod K).

Figure 6C:
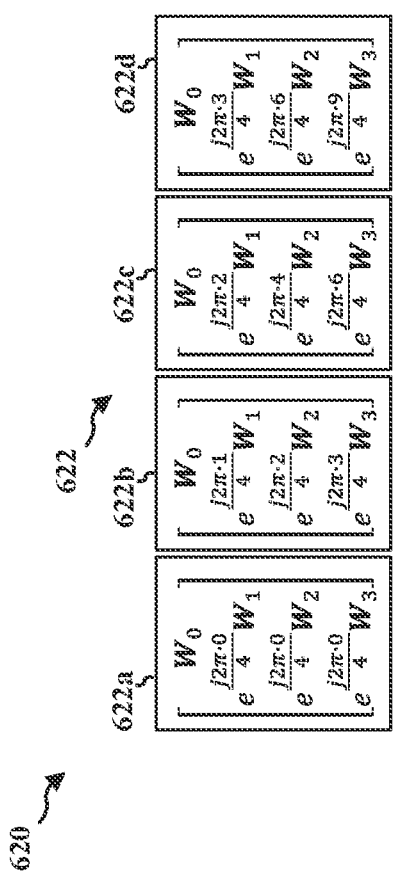
FIG. 6C is a diagram of a third set of precoding matrices for non-transparent precoder cycling for 4 antenna groups with a frequency domain resource group size of 4.

FIG. 6C is a diagram of a third set 620 of precoding matrices 622 (e.g., 622a, 622b, 622c, and 622d) for non-transparent precoder cycling for 4 antenna groups with a frequency domain resource group size of 4. Each precoding matrix 622 in the third set 620 includes four sub-matrices corresponding to the four antenna groups. A first sub-matrix ($W_0$) for a first antenna group is the same for each frequency domain resource unit (e.g., RB) of a frequency domain resource group of K (e.g., K=4) frequency domain resource units. A phase of each subsequent sub-matrix ($W_1$, $W_2$, $W_3$) for each subsequent antenna group is shifted (e.g., by a factor of $$\left(e.g., by\ e^{\frac{j2\pi \cdot [k]_K}{K}}\right)$$

to be orthogonal for each frequency domain resource unit of the frequency domain resource group. For the first frequency domain resource unit (RB0), k is 0, so the sub-matrix $W_1$ is not shifted. For the other resource blocks, each subsequent sub-matrix is shifted by another factor of $$e^{\frac{j2\pi [k]_K}{K}}.$$

For instance, for the third frequency domain resource unit (RB2) where k=2, the phase of the third subsequent sub-matrix $W_3$ is shifted by a factor of $$e^{\frac{j2\pi \cdot 2\cdot 3}{K}} = e^{\frac{j2\pi \cdot 6}{K}}.$$

The defined non-transparent precoder cycling allows the receiving device (e.g., UE 104) to perform channel estimation for either the frequency domain resource unit or the frequency domain resource group based on the precoding matrix and/or the virtual DMRS port. That is, the phase shift values applied to the precoding matrix are known to the UE 104. The UE may perform channel estimation based on the phase shift values. In some cases, the DMRS to data signal mapping is the identity matrix, simplifying the channel estimation.

Figure 7:
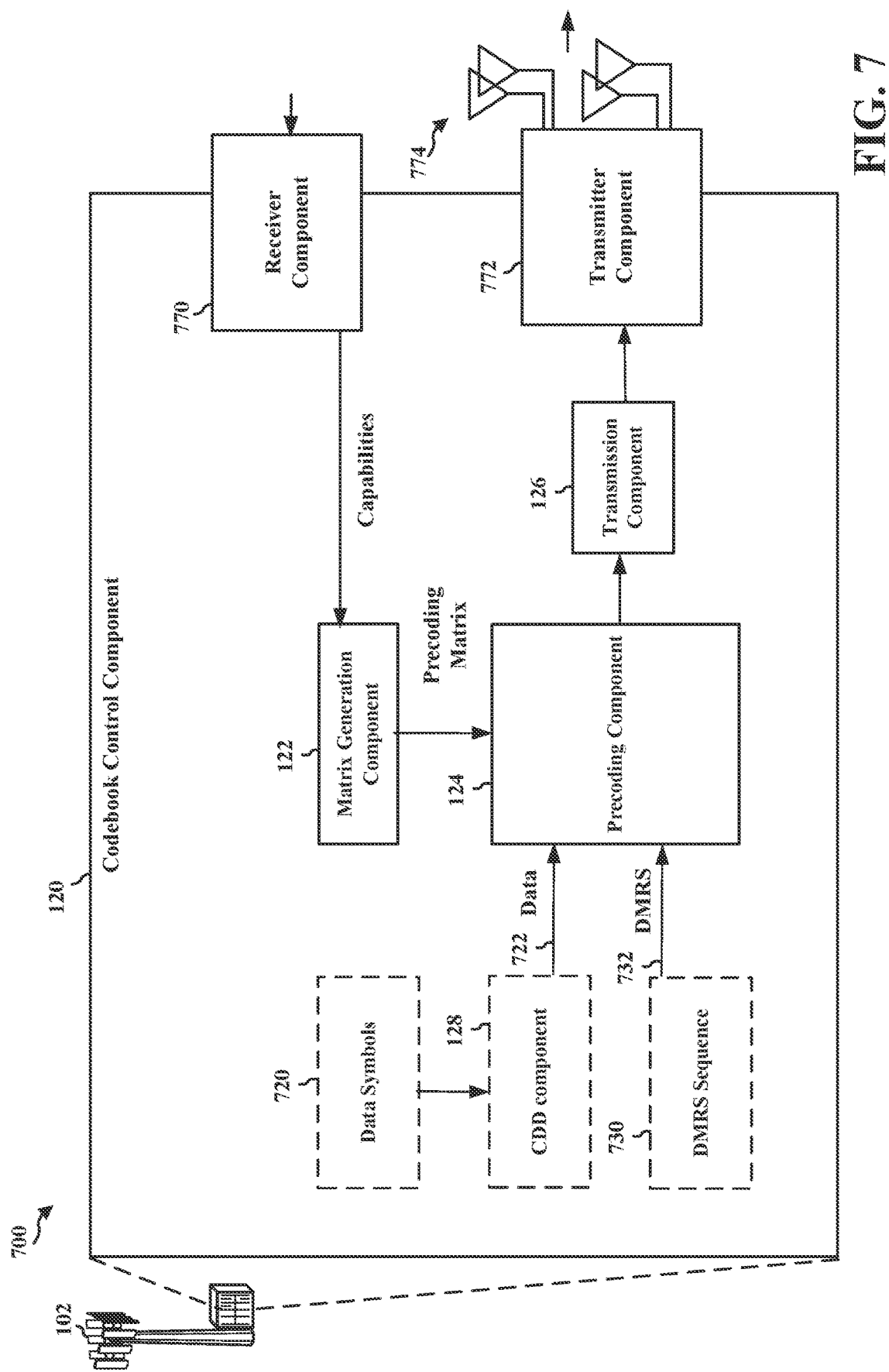
FIG. 7 is a conceptual data flow diagram illustrating the data flow between different means/components in an example network node.

FIG. 7 is a conceptual data flow diagram 700 illustrating the data flow between different means/components in an example base station 102, which may be an example of the base station 102 (FIG. 1) including the Tx precoder cycling component 120. The Tx precoder cycling component 120 may be implemented by the memory 376 and the TX processor 316, the RX processor 370, and/or the controller/processor 375 of FIG. 3. For example, the memory 376 may store executable instructions defining the Tx precoder cycling component 120 and the TX processor 316, the RX processor 370, and/or the controller/processor 375 may execute the instructions.

The base station 102 may include a receiver component 770, which may include, for example, a radio frequency (RF) receiver for receiving the signals described herein. The base station 102 may include a transmitter component 772, which may include, for example, an RF transmitter for transmitting the signals described herein. The transmitter component 772 may output RF signals to a plurality of antenna groups 774. In an aspect, the receiver component 770 and the transmitter component 772 may be co-located in a transceiver such as illustrated by the TX/RX 318 in FIG. 3.

As discussed with respect to FIG. 1, the Tx precoder cycling component 120 may include the matrix generation component 122, the precoding component 124, and the transmission component 126. In some implementations, the Tx precoder cycling component 120 may optionally include the CDD component 128.

The receiver component 770 may receive UL signals from the UE 104 such as the capability message 515. The receiver component 770 may output the capability message 515 to the matrix generation component 122.

The matrix generation component 122 is configured to generate a precoding matrix comprising a number of sub-matrices equal to a number of antenna groups. In some implementations, the precoding matrix is an $N_t \times R$ matrix, where R is a rank of the transmission. With such a precoding matrix, an R-port DMRS to data signal mapping is an identity matrix of size R. The precoding matrix may be one of the example precoding matrices discussed above with respect to FIGS. 6A-6C. A first sub-matrix for a first antenna group is the same for each frequency domain resource unit of a frequency domain resource group of K frequency domain resource units. A phase of each subsequent sub-matrix for each subsequent antenna group is shifted to be orthogonal for each frequency domain resource unit of the frequency domain resource group. The matrix generation component 122 outputs the sets 600, 610, 620 of precoding matrices 602, 612, 622 to the precoding component 124.

The precoding component 124 is configured to apply a respective precoding matrix 602, 612, 622 to both a data signal 722 and a DMRS 732 of a transmission for each frequency domain resource unit of the frequency domain resource group for non-transparent precoder cycling. For example, the precoding component 124 may apply the precoding matrix for each frequency domain resource unit to the respective frequency domain resource unit within the frequency domain resource group. The pattern for the precoding matrix may be repeated for each frequency domain resource group.

In some implementations, the CDD component 128 is configured to precode the data signal with small delay cyclic delay diversity prior to precoding at a PRG-level with the precoding matrix. For example, the data signal may be based on data symbols 720. The CDD component 128 may apply small delay values $\delta_0^{cyc}, \ldots, \delta_3^{cyc}$ that are configured to the UE. For example, the small delay values may be configured via the system information 510, the RRC configuration 520, or may be published in a standard or regulation. The CDD component 128 may apply the delay values when the precoding matrix is applied at the PRG level (i.e., the frequency domain resource unit is a PRG). The CDD component 128 outputs the CDD precoded data signal 722 to the precoding component 124.

In an aspect, a port mapping may be defined between DMRS 732 (applying the same precoding to a DMRS sequence 730 as the data signal 722) and a virtual or physical RS (XRS) used to define the CDD transmission. For example, the port mapping in case of two antenna groups may be written as:

$$\beta_{DMRS} \begin{bmatrix} a_{DMRS}^{(p_0)}(m) \\ a_{DMRS}^{(p_0)}(m) \\ \vdots \\ a_{DMRS}^{(p_R)}(m) \end{bmatrix} =$$

$$\beta_{XRS}[U_{2\times R}]^H \begin{bmatrix} 1 & 0 \\ 0 & e^{j2\pi \frac{[l]_L}{L}} \end{bmatrix} \begin{bmatrix} e^{j2\pi \frac{\delta_0^{cyc}}{N_{\mathit{fft}}} m} & 0 \\ 0 & e^{j2\pi \frac{\delta_1^{cyc}}{N_{\mathit{fft}}} m} \end{bmatrix} \begin{bmatrix} a_{XRS}^{(p_0)}(m) \\ a_{XRS}^{(p_1)}(m) \end{bmatrix}$$

where m is the RE index, I is the PRG index, and L is the number of PRGs in the frequency domain resource group (i.e., a group of PRGs).

As another example, the port mapping in case of four antenna groups may be written as:

$$\beta_{DMRS} \begin{bmatrix} a_{DMRS}^{(\tilde{p}_0)}(m) \\ a_{DMRS}^{(\tilde{p}_0)}(m) \\ \vdots \\ a_{DMRS}^{(\tilde{p}_R)}(m) \end{bmatrix} = \beta_{XRS}[U_{4\times R}]^H \mathrm{diag}\left[1, e^{j2\pi\frac{[l]_L}{L}}, e^{j4\pi\frac{[l]_L}{L}}, e^{j6\pi\frac{[l]_L}{L}}\right] \cdot$$

$$\mathrm{diag}\left[e^{j2\pi\frac{\delta_0^{cyc}}{N_{fft}}m}, e^{j2\pi\frac{\delta_1^{cyc}}{N_{fft}}m}, e^{j2\pi\frac{\delta_2^{cyc}}{N_{fft}}m}, e^{j2\pi\frac{\delta_3^{cyc}}{N_{fft}}m}\right] \begin{bmatrix} a_{XRS}^{(p_0)}(m) \\ a_{XRS}^{(p_1)}(m) \\ a_{XRS}^{(p_2)}(m) \\ a_{XRS}^{(p_3)}(m) \end{bmatrix}$$

where $U_{N\times R}$ is an $N_t \times R$ unitary matrix.

In an aspect, the combination of small delay CDD and PRG-level non-transparent precoder cycling provides a high delay diversity performance. Due to additional orthogonal cover codes to separate DMRS ports, the XRS ports can be separately estimated to provide wideband channel estimation. Further, each PRG went through separate precoder cycling for frequency domain diversity. This transmission scheme is consistent with DMRS transmission, which simplifies interference estimation.

The transmission component 126 is configured to transmit the precoded transmission via the antenna groups. For example, the transmission component 126 may provide the precoded transmission for each antenna group to the appropriate transceiver (e.g., RX/TX) 354 of the transmitter component 772.

Figure 8:
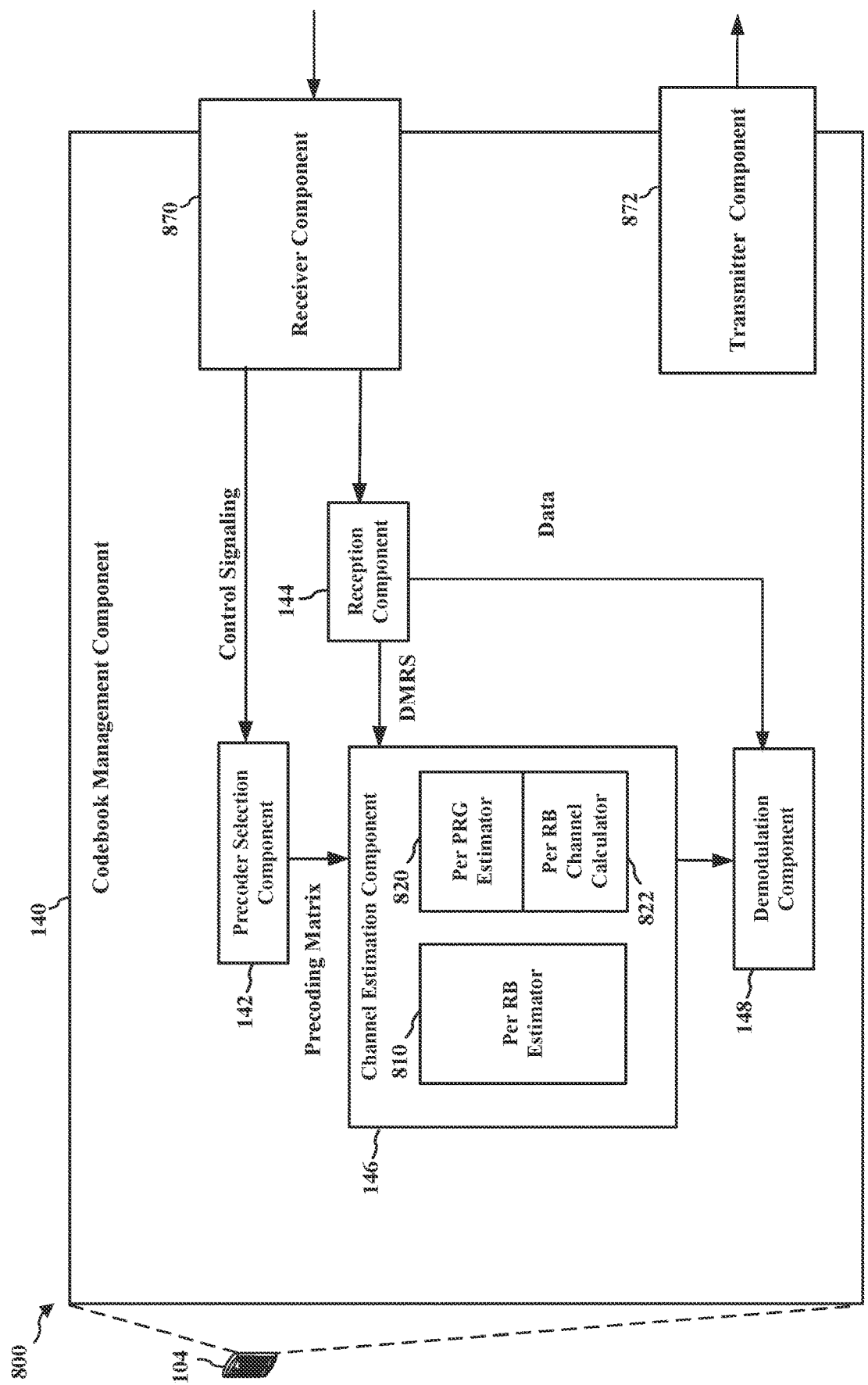
FIG. 8 is a conceptual data flow diagram illustrating the data flow between different means/components in an example UE.

FIG. 8 is a conceptual data flow diagram 800 illustrating the data flow between different means/components in an example UE 104, which may be an example of the UE 104 (FIG. 1) and include the Rx precoder cycling component 140. The Rx precoder cycling component 140 may be implemented by the memory 360 and the TX processor 368, the RX processor 356, and/or the controller/processor 359. For example, the memory 360 may store executable instructions defining the Rx precoder cycling component 140 and the TX processor 368, the RX processor 356, and/or the controller/processor 359 may execute the instructions.

The UE 104 may include a receiver component 870, which may include, for example, a RF receiver for receiving the signals described herein. The UE 104 may include a transmitter component 872, which may include, for example, an RF transmitter for transmitting the signals described herein. In an aspect, the receiver component 870 and the transmitter component 872 may co-located in a transceiver such as the TX/RX 352 in FIG. 3.

As discussed with respect to FIG. 1, the Rx precoder cycling component 140 includes the precoder selection component 142, the reception component 144, the channel estimation component 146, and the demodulation component 148.

The receiver component 870 may receive DL signals described herein such as the SSB 505, system information 510, RRC configuration 520, and transmission 540. The receiver component 870 may output the SSB 505, system information 510, or RRC configuration 520 to the precoder selection component 142 as control signaling. The receiver component 870 may output the control signaling to the precoder selection component 142. The receiver component 870 may output the transmission 540 to the reception component 144.

The precoder selection component 142 is configured to select or identify a precoding matrix to be used for reception. The precoder selection component 142 may receive control signaling (e.g., system information 510 and/or RRC configuration 520) indicating parameters of the precoding matrix. The precoding matrix may include a number of sub-matrices equal to a number of antenna groups. A first sub-matrix for a first antenna group is the same for each frequency domain resource unit and a phase of each subsequent sub-matrix for each subsequent antenna group is shifted to be orthogonal across the frequency domain resource units of the frequency domain resource group. The precoder selection component 142 may provide a set 600, 610, 620 of precoding matrices 602, 612, 622 to the channel estimation component 146.

The reception component 144 is configured to receive a transmission having non-transparent precoder cycling applied to each frequency domain resource unit of a frequency domain resource group of K frequency domain resource units in which both a data signal and a DMRS are precoded with a precoding matrix. The precoding matrix is the precoding matrix selected by the precoder selection component 142. The reception component 144 may provide the DMRS to the channel estimation component 146. The reception component 144 may provide the data signal to the demodulation component 148.

The channel estimation component 146 is configured to estimate a channel of the transmission based on the precoding matrix. In some implementations, the channel estimation component 146 may have two options for channel estimation for the non-transparent precoder cycling. The channel estimation component 146 may be configured to perform one or both options. The channel estimation component 146 may output the channel estimates to the demodulation component 148.

For example, the channel estimation component 146 may include a per RB estimator 810 configured to perform DMRS channel estimation for each RB based on the precoding matrix for the RB. For instance, the per RB estimator 810 may determine any phase shifts applied by the precoding and estimate the channel based on the known DMRS sequence. The per RB estimator 810 may also perform interference channel estimation using the same RB level DMRS estimation.

As another example, the channel estimation component 146 may include a per PRG estimator 820 and a per RB channel calculator 822. The per PRG estimator 820 may acquire a virtual DMRS channel per antenna group (e.g., $H_0 W_0$ and $H_1 W_1$) after performing DMRS channel estimation for a PRG unit. The per RB channel calculator 822 may calculate a per-RB channel based on the virtual DMRS channel and the phase-shift for each RB as defined by the precoding matrix (e.g., $H_0 W_0$ and $$e^{j2\pi\frac{[k]_K}{K}} H_1 W_1).$$

The demodulation component 148 is configured to demodulate the data signal based on the estimated channel. For example, the demodulation component 148 may apply the channel estimate to each RB of the received data signal to determine the modulation symbol for each RE.

Figure 9:
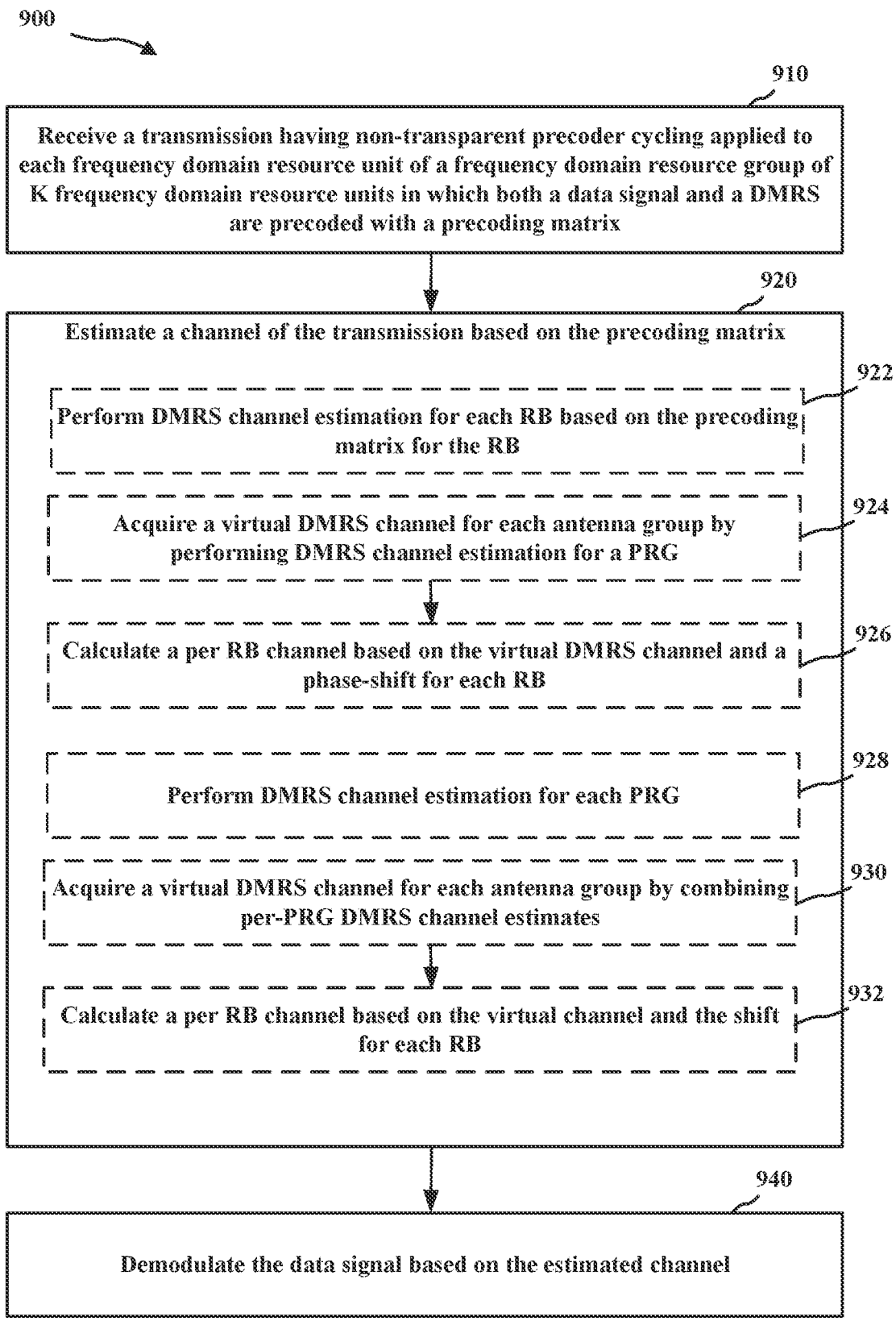
FIG. 9 is a flowchart of an example method for a UE to receive a transmission with non-transparent precoder cycling.

FIG. 9 is a flowchart of an example method 900 for a UE to receive a transmission with non-transparent precoder cycling. The method 900 may be performed by a UE (such as the UE 104, which may include the memory 360 and which may be the entire UE 104 or a component of the UE 104 such as the Rx precoder cycling component 140, TX processor 368, the RX processor 356, or the controller/processor 359). The method 900 may be performed by the Rx precoder cycling component 140 in communication with the Tx precoder cycling component 120 of the base station 102. Optional blocks are shown with dashed lines.

At block 910, the method 900 includes receiving a transmission having non-transparent precoder cycling applied to each frequency domain resource unit of a frequency domain resource group of K frequency domain resource units in which both a data signal and a DMRS are precoded with a precoding matrix comprising a number of sub-matrices equal to a number of antenna groups. In some implementations, for example, the UE 104, the RX processor 356 or the controller/processor 359 may execute the Rx precoder cycling component 140 or the reception component 144 to receive the 540 having non-transparent precoder cycling applied to each frequency domain resource unit (e.g., RB or PRG) of a frequency domain resource group of K frequency domain resource units in which both a data signal 542 and a DMRS 544 are precoded with a precoding matrix 602, 612, 622 comprising a number of sub-matrices equal to a number of antenna groups. A first sub-matrix for a first antenna group is the same for each frequency domain resource unit and a phase of each subsequent sub-matrix for each subsequent antenna group is shifted to be orthogonal across the frequency domain resource units of the frequency domain resource group. In some implementations, the frequency domain resource unit is a RB and the frequency domain resource group is a PRG of K RBs. In some implementations, the frequency domain resource unit is a PRG and the frequency domain resource group is a group of PRGs. In some implementations, the precoding matrix is an $N_t \times R$ matrix, where R is a rank of the transmission, and wherein an R-port DMRS to data signal mapping is an identity matrix of size R. Accordingly, the UE 104, the RX processor 356, or the controller/processor 359 executing the Rx precoder cycling component 140 or precoder selection component 142 may provide means for receiving a transmission having non-transparent precoder cycling applied to each frequency domain resource unit of a frequency domain resource group of K frequency domain resource units in which both a data signal and a DMRS are precoded with a precoding matrix comprising a number of sub-matrices equal to a number of antenna groups.

At block 920, the method 900 includes estimating a channel of the transmission based on the precoding matrix. In some implementations, for example, the UE 104, the RX processor 356 or the controller/processor 359 may execute the Rx precoder cycling component 140 or the channel estimation component 146 to estimate a channel (H) of the transmission based on the precoding matrix.

In some implementations where frequency domain resource unit is a RB, the block 920 may optionally include, at sub-block 922, performing DMRS channel estimation for each RB based on the precoding matrix for the RB. In some implementations where frequency domain resource unit is a RB, the block 920 may optionally include, at sub-block 924, acquiring a virtual DMRS channel for each antenna group by performing DMRS channel estimation for a PRG. At sub-block 926, the block 920 may further optionally include calculating a per RB channel based on the virtual DMRS channel and a phase-shift for each RB.

In some implementations, where the frequency domain resource unit is a PRG, the block 920 may optionally include, at sub-block 928, performing DMRS channel estimation for each PRG. In some implementations, where the frequency domain resource unit is a PRG, the block 920 may optionally include, at sub-block 930 acquiring a virtual DMRS channel for each antenna group by combining per-PRG DMRS channel estimates. At sub-block 932, the block 920 may further optionally include calculating a per RB channel based on the virtual channel and the shift for each RB.

In view of the above, the UE 104, the RX processor 356, or the controller/processor 359 executing the Rx precoder cycling component 140 or the reception component 144 may provide means for estimating a channel of the transmission based on the precoding matrix.

At block 940, the method 900 includes demodulating the data signal based on the estimated channel. In some implementations, for example, the UE 104, the RX processor 356 or the controller/processor 359 may execute the Rx precoder cycling component 140 or the demodulation component 148 to demodulate the data signal based on the estimated channel.

Accordingly, the UE 104, the RX processor 356, or the controller/processor 359 executing the Rx precoder cycling component 140 or precoder selection component 142 may provide means for receiving a transmission having non-transparent precoder cycling applied to each frequency domain resource unit of a frequency domain resource group of K frequency domain resource units in which both a data signal and a DMRS are precoded with a precoding matrix comprising a number of sub-matrices equal to a number of antenna groups.

Figure 10:
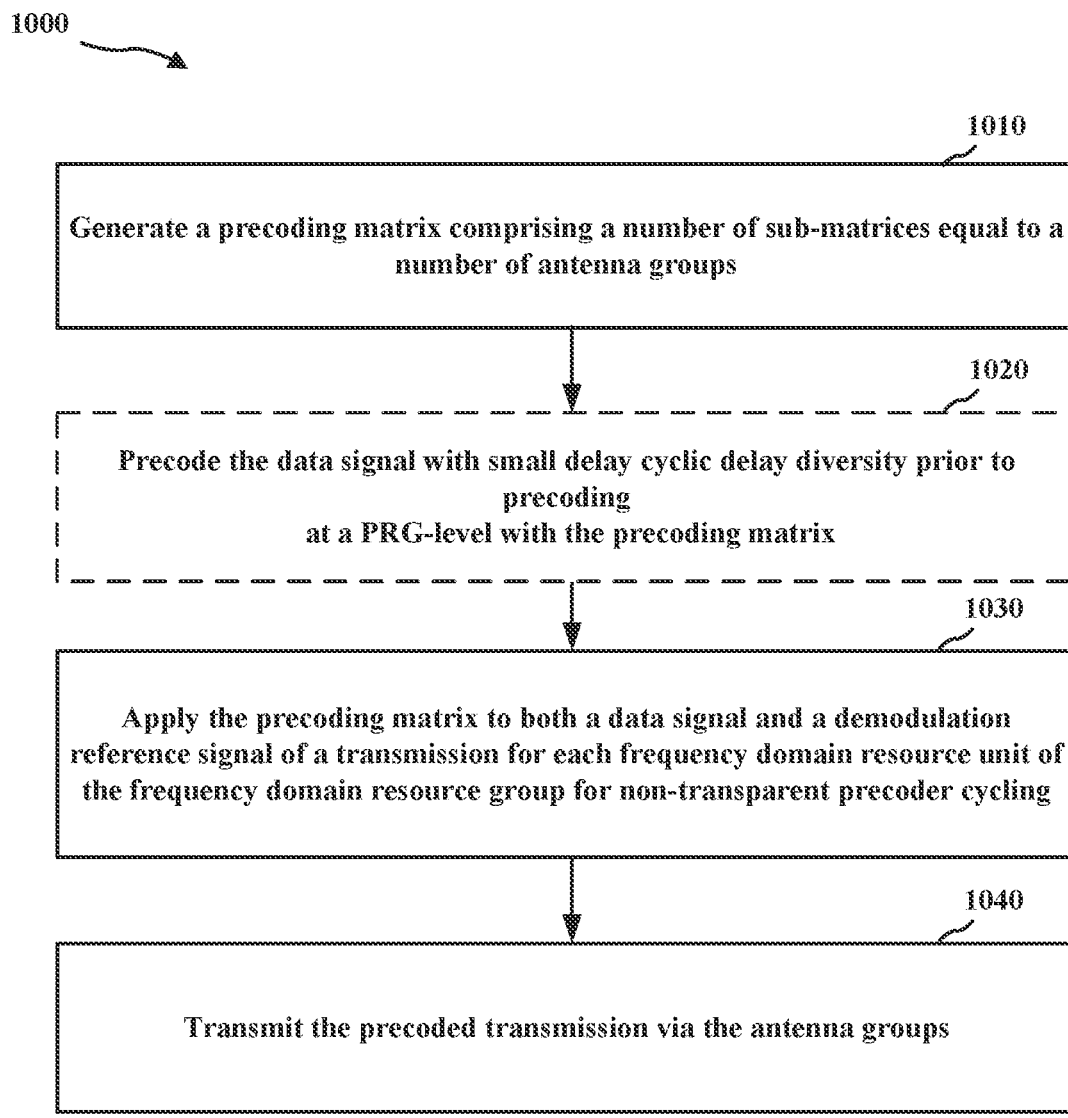
FIG. 10 is a flowchart of an example method for a network node (e.g., a BS or gNB) to transmit data with non-transparent precoder cycling.

FIG. 10 is a flowchart of an example method 1000 for a network node (e.g., a base station or gNB) to transmit data with non-transparent precoder cycling. For example, the method 1000 may be used for open-loop MIMO transmissions. The method 1000 may be performed by a network node (such as the base station 102, which may include the memory 376 and which may be the entire base station 102 or a component of the base station 102 such as the Tx precoder cycling component 120, the TX processor 316, the RX processor 370, or the controller/processor 375). The method 1000 may be performed by the Tx precoder cycling component 120 in communication with the Rx precoder cycling component 140 of the UE 104.

At block 1010, the method 1000 includes generating a precoding matrix comprising a number of sub-matrices equal to a number of antenna groups. In some implementations, for example, the base station 102, the TX processor 316, or the controller/processor 375 may execute the Tx precoder cycling component 120 or the matrix generation component 122 to generate the precoding matrix 602, 612, 622 comprising a number of sub-matrices equal to a number of antenna groups. In the precoding matrix, a first sub-matrix for a first antenna group is the same for each frequency domain resource unit of a frequency domain resource group of K frequency domain resource units. Additionally, a phase of each subsequent sub-matrix for each subsequent antenna group is shifted to be orthogonal for each frequency domain resource unit of the frequency domain resource group. In some implementations, the precoding matrix is an $N_t \times R$ matrix, where R is a rank of the transmission, and wherein an R-port DMRS to data signal mapping is an identity matrix of size R. Accordingly, the base station 102, the TX processor 316, or the controller/processor 375 executing the Tx precoder cycling component 120 or the matrix generation component 122 may provide means for generating a precoding matrix comprising a number of sub-matrices equal to a number of antenna groups.

At block 1020, the method 1000 may optionally include precoding the data signal with small delay cyclic delay diversity prior to precoding at a PRG-level with the precoding matrix. In some implementations, for example, the base station 102, the TX processor 316, or the controller/processor 375 may execute the Tx precoder cycling component 120 or the CDD component 128 to precode the data signal with small delay cyclic delay diversity prior to precoding at a PRG-level with the precoding matrix. Accordingly, the base station 102, the TX processor 316, or the controller/processor 375 executing the Tx precoder cycling component 120 or the CDD component 128 may provide means for precoding the data signal with small delay cyclic delay diversity prior to precoding at a PRG-level with the precoding matrix.

At block 1030, the method 1000 includes applying the precoding matrix to both a data signal and a DMRS of a transmission for each frequency domain resource unit of the frequency domain resource group for non-transparent precoder cycling. In some implementations, for example, the base station 102, the TX processor 316, or the controller/processor 375 may execute the Tx precoder cycling component 120 or the precoding component 124 to apply the precoding matrix to both a data signal and a DMRS of a transmission for each frequency domain resource unit of the frequency domain resource group for non-transparent precoder cycling. Accordingly, the base station 102, the TX processor 316, or the controller/processor 375 executing the Tx precoder cycling component 120 or the precoding component 124 may provide means for applying the precoding matrix to both a data signal and a DMRS of a transmission for each frequency domain resource unit of the frequency domain resource group for non-transparent precoder cycling.

At block 1040, the method 1000 includes transmitting the precoded transmission via the antenna groups. In some implementations, for example, the base station 102, the TX processor 316, or the controller/processor 375 may execute the Tx precoder cycling component 120, the transmission component 126, and/or the transmitter component 772 to transmit the precoded transmission via the antenna groups 774. Accordingly, the base station 102, the TX processor 316, or the controller/processor 375 executing Tx precoder cycling component 120, the transmission component 126, and/or the transmitter component 772 may provide means for transmitting the precoded transmission via the antenna groups.

The following numbered clauses provide an overview of aspects of the present disclosure:

Clause 1. An apparatus for wireless communication at a user equipment (UE), comprising: one or more memories storing computer-executable instructions; and one or more processors coupled with the one or more memories and configured to execute the computer-executable instructions, individually or in combination, to cause the apparatus to: receive a transmission having non-transparent precoder cycling applied to each frequency domain resource unit of a frequency domain resource group of K frequency domain resource units in which both a data signal and a demodulation reference signal (DMRS) are precoded with a precoding matrix comprising a number of sub-matrices equal to a number of antenna groups, wherein a first sub-matrix for a first antenna group is the same for each frequency domain resource unit and a phase of each subsequent sub-matrix for each subsequent antenna group is shifted to be orthogonal across the frequency domain resource units of the frequency domain resource group; estimate a channel of the transmission based on the precoding matrix; and demodulate the data signal based on the estimated channel.

Clause 2. The apparatus of clause 1, wherein the frequency domain resource unit is a resource block (RB) and the frequency domain resource group is a physical resource group (PRG) of K RBs.

Clause 3. The apparatus of clause 2, wherein to estimate the channel of the transmission based on the precoding matrix the one or more processors, individually or in combination, are configured to perform DMRS channel estimation for each RB based on the precoding matrix for the RB.

Clause 4. The apparatus of clause 2, wherein to estimate the channel of the transmission based on the precoding matrix the one or more processors, individually or in combination, are configured to: acquire a virtual DMRS channel for each antenna group by performing DMRS channel estimation for a PRG; and calculate a per RB channel based on the virtual DMRS channel and a phase-shift for each RB.

Clause 5. The apparatus of clause 1, wherein the frequency domain resource unit is a physical resource group (PRG) and the frequency domain resource group is a group of PRGs.

Clause 6. The apparatus of clause 5, wherein to estimate the channel of the transmission based on the precoding matrix the one or more processors, individually or in combination, are configured to perform DMRS channel estimation for each PRG.

Clause 7. The apparatus of clause 5, to estimate the channel of the transmission based on the precoding matrix the one or more processors, individually or in combination, are configured to: acquire a virtual DMRS channel for each antenna group by combining per-PRG DMRS channel estimates; and calculate a per RB channel based on the virtual channel and the shift for each RB.

Clause 8. The apparatus of clause 5, wherein the data signal is precoded with small delay cyclic delay diversity prior to precoding at a PRG-level with the precoding matrix.

Clause 9. The apparatus of clause 1, wherein the precoding matrix is an $N_t \times R$ matrix, where R is a rank of the transmission, and wherein an R-port DMRS to data signal mapping is an identity matrix of size R.

Clause 10. An apparatus for wireless communication, comprising: one or more memories storing computer-executable instructions; and one or more processors coupled with the one or more memories and configured to execute the computer-executable instructions, individually or in combination, to cause the apparatus to: generate a precoding matrix comprising a number of sub-matrices equal to a number of antenna groups, wherein a first sub-matrix for a first antenna group is the same for each frequency domain resource unit of a frequency domain resource group of K frequency domain resource units, and wherein a phase of each subsequent sub-matrix for each subsequent antenna group is shifted to be orthogonal for each frequency domain resource unit of the frequency domain resource group; apply the precoding matrix to both a data signal and a demodulation reference signal (DMRS) of a transmission for each frequency domain resource unit of the frequency domain resource group for non-transparent precoder cycling; and transmit the precoded transmission via the antenna groups.

Clause 11. The apparatus of clause 10, wherein the frequency domain resource unit is a resource block (RB) and the frequency domain resource group is a physical resource group (PRG) of K RBs.

Clause 12. The apparatus of clause 10, wherein the frequency domain resource unit is a physical resource group (PRG) and the frequency domain resource group is a group of PRGs.

Clause 13. The apparatus of clause 12, wherein the one or more processors, individually or in combination, are configured to precode the data signal with small delay cyclic delay diversity prior to precoding at a PRG-level with the precoding matrix.

Clause 14. The apparatus of clause 10, wherein the precoding matrix is an $N_t \times R$ matrix, where R is a rank of the transmission, and wherein an R-port DMRS to data signal mapping is an identity matrix of size R.

Clause 15. The apparatus of clause 10, wherein the transmission is one of a broadcast data transmission, a control channel, a transmission prior to radio resource control connection establishment, or a fallback transmission.

Clause 16. A method of wireless communication at a user equipment (UE), comprising: receiving a transmission having non-transparent precoder cycling applied to each frequency domain resource unit of a frequency domain resource group of K frequency domain resource units in which both a data signal and a demodulation reference signal (DMRS) are precoded with a precoding matrix comprising a number of sub-matrices equal to a number of antenna groups, wherein a first sub-matrix for a first antenna group is the same for each frequency domain resource unit and a phase of each subsequent sub-matrix for each subsequent antenna group is shifted to be orthogonal across the frequency domain resource units of the frequency domain resource group; estimating a channel of the transmission based on the precoding matrix; and demodulating the data signal based on the estimated channel.

Clause 17. The method of clause 16, wherein the frequency domain resource unit is a resource block (RB) and the frequency domain resource group is a physical resource group (PRG) of K RBs.

Clause 18. The method of clause 17, wherein estimating the channel of the transmission based on the precoding matrix comprises performing DMRS channel estimation for each RB based on the precoding matrix for the RB.

Clause 19. The method of clause 17, wherein estimating a channel of the transmission based on the precoding matrix comprises: acquiring a virtual DMRS channel for each antenna group by performing DMRS channel estimation for a PRG; and calculating a per RB channel based on the virtual DMRS channel and a phase-shift for each RB.

Clause 20. The method of clause 16, wherein the frequency domain resource unit is a physical resource group (PRG) and the frequency domain resource group is a group of PRGs.

Clause 21. The method of clause 20, wherein estimating the channel of the transmission based on the precoding matrix comprises performing DMRS channel estimation for each PRG.

Clause 22. The method of clause 20, wherein estimating a channel of the transmission comprises: acquiring a virtual DMRS channel for each antenna group by combining per-PRG DMRS channel estimates; and calculating a per RB channel based on the virtual channel and the shift for each RB.

Clause 23. The method of clause 20, wherein the data signal is precoded with small delay cyclic delay diversity prior to precoding at a PRG-level with the precoding matrix.

Clause 24. The method of clause 16, wherein the precoding matrix is an $N_t \times R$ matrix, where R is a rank of the transmission, and wherein an R-port DMRS to data signal mapping is an identity matrix of size R.

Clause 25. A method of wireless communication at a network node, comprising: generating a precoding matrix comprising a number of sub-matrices equal to a number of antenna groups, wherein a first sub-matrix for a first antenna group is the same for each frequency domain resource unit of a frequency domain resource group of K frequency domain resource units, and wherein a phase of each subsequent sub-matrix for each subsequent antenna group is shifted to be orthogonal for each frequency domain resource unit of the frequency domain resource group; applying the precoding matrix to both a data signal and a demodulation reference signal (DMRS) of a transmission for each frequency domain resource unit of the frequency domain resource group for non-transparent precoder cycling; and transmitting the precoded transmission via the antenna groups.

Clause 26. The method of clause 25, wherein the frequency domain resource unit is a resource block (RB) and the frequency domain resource group is a physical resource group (PRG) of K RBs.

Clause 27. The method of clause 25, wherein the frequency domain resource unit is a physical resource group (PRG) and the frequency domain resource group is a group of PRGs.

Clause 28. The method of clause 27, further comprising precoding the data signal with small delay cyclic delay diversity prior to precoding at a PRG-level with the precoding matrix.

Clause 29. The method of clause 25, wherein the precoding matrix is an $N_t \times R$ matrix, where R is a rank of the transmission, and wherein an R-port DMRS to data signal mapping is an identity matrix of size R.

Clause 30. The method of clause 25, wherein the transmission is one of a broadcast data transmission, a control channel, a transmission prior to radio resource control connection establishment, or a fallback transmission.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for wireless communication at a user equipment (UE), comprising:
   one or more memories storing computer-executable instructions; and
   one or more processors coupled with the one or more memories and configured to execute the computer-executable instructions, individually or in combination, to cause the apparatus to:
   receive a transmission having non-transparent precoder cycling applied to each frequency domain resource unit of a frequency domain resource group of K frequency domain resource units in which both a data signal and a demodulation reference signal (DMRS) are precoded with a precoding matrix comprising a number of sub-matrices equal to a number of antenna groups, wherein a first sub-matrix for a first antenna group is the same for each frequency domain resource unit and a phase of each subsequent sub-matrix for each subsequent antenna group is shifted to be orthogonal across the frequency domain resource units of the frequency domain resource group;
   estimate a channel of the transmission based on the precoding matrix; and
   demodulate the data signal based on the estimated channel.

2. The apparatus of claim 1, wherein the frequency domain resource unit is a resource block (RB) and the frequency domain resource group is a physical resource group (PRG) of K RBs.

3. The apparatus of claim 2, wherein to estimate the channel of the transmission based on the precoding matrix the one or more processors, individually or in combination, are configured to perform DMRS channel estimation for each RB based on the precoding matrix for the RB.

4. The apparatus of claim 2, wherein to estimate the channel of the transmission based on the precoding matrix the one or more processors, individually or in combination, are configured to:
acquire a virtual DMRS channel for each antenna group by performing DMRS channel estimation for a PRG; and
calculate a per RB channel based on the virtual DMRS channel and a phase-shift for each RB.

5. The apparatus of claim 1, wherein the frequency domain resource unit is a physical resource group (PRG) and the frequency domain resource group is a group of PRGs.

6. The apparatus of claim 5, wherein to estimate the channel of the transmission based on the precoding matrix the one or more processors, individually or in combination, are configured to perform DMRS channel estimation for each PRG.

7. The apparatus of claim 5, to estimate the channel of the transmission based on the precoding matrix the one or more processors, individually or in combination, are configured to:
acquire a virtual DMRS channel for each antenna group by combining per-PRG DMRS channel estimates; and
calculate a per RB channel based on the virtual channel and the shift for each RB.

8. The apparatus of claim 5, wherein the data signal is precoded with small delay cyclic delay diversity prior to precoding at a PRG-level with the precoding matrix.

9. The apparatus of claim 1, wherein the precoding matrix is an $N_t \times R$ matrix, where R is a rank of the transmission, and wherein an R-port DMRS to data signal mapping is an identity matrix of size R.

10. An apparatus for wireless communication, comprising:
one or more memories storing computer-executable instructions; and
one or more processors coupled with the one or more memories and configured to execute the computer-executable instructions, individually or in combination, to cause the apparatus to:
generate a precoding matrix comprising a number of sub-matrices equal to a number of antenna groups, wherein a first sub-matrix for a first antenna group is the same for each frequency domain resource unit of a frequency domain resource group of K frequency domain resource units, and wherein a phase of each subsequent sub-matrix for each subsequent antenna group is shifted to be orthogonal for each frequency domain resource unit of the frequency domain resource group;
apply the precoding matrix to both a data signal and a demodulation reference signal (DMRS) of a transmission for each frequency domain resource unit of the frequency domain resource group for non-transparent precoder cycling; and
transmit the precoded transmission via the antenna groups.

11. The apparatus of claim 10, wherein the frequency domain resource unit is a resource block (RB) and the frequency domain resource group is a physical resource group (PRG) of K RBs.

12. The apparatus of claim 10, wherein the frequency domain resource unit is a physical resource group (PRG) and the frequency domain resource group is a group of PRGs.

13. The apparatus of claim 12, wherein the one or more processors, individually or in combination, are configured to precode the data signal with small delay cyclic delay diversity prior to precoding at a PRG-level with the precoding matrix.

14. The apparatus of claim 10, wherein the precoding matrix is an $N_t \times R$ matrix, where R is a rank of the transmission, and wherein an R-port DMRS to data signal mapping is an identity matrix of size R.

15. The apparatus of claim 10, wherein the transmission is one of a broadcast data transmission, a control channel, a transmission prior to radio resource control connection establishment, or a fallback transmission.

16. A method of wireless communication at a user equipment (UE), comprising:
receiving a transmission having non-transparent precoder cycling applied to each frequency domain resource unit of a frequency domain resource group of K frequency domain resource units in which both a data signal and a demodulation reference signal (DMRS) are precoded with a precoding matrix comprising a number of sub-matrices equal to a number of antenna groups, wherein a first sub-matrix for a first antenna group is the same for each frequency domain resource unit and a phase of each subsequent sub-matrix for each subsequent antenna group is shifted to be orthogonal across the frequency domain resource units of the frequency domain resource group;
estimating a channel of the transmission based on the precoding matrix; and
demodulating the data signal based on the estimated channel.

17. The method of claim 16, wherein the frequency domain resource unit is a resource block (RB) and the frequency domain resource group is a physical resource group (PRG) of K RBs.

18. The method of claim 17, wherein estimating the channel of the transmission based on the precoding matrix comprises performing DMRS channel estimation for each RB based on the precoding matrix for the RB.

19. The method of claim 17, wherein estimating a channel of the transmission based on the precoding matrix comprises:
acquiring a virtual DMRS channel for each antenna group by performing DMRS channel estimation for a PRG; and
calculating a per RB channel based on the virtual DMRS channel and a phase-shift for each RB.

20. The method of claim 16, wherein the frequency domain resource unit is a physical resource group (PRG) and the frequency domain resource group is a group of PRGs.

21. The method of claim 20, wherein estimating the channel of the transmission based on the precoding matrix comprises performing DMRS channel estimation for each PRG.

22. The method of claim 20, wherein estimating a channel of the transmission comprises:
acquiring a virtual DMRS channel for each antenna group by combining per-PRG DMRS channel estimates; and
calculating a per RB channel based on the virtual channel and the shift for each RB.

23. The method of claim 20, wherein the data signal is precoded with small delay cyclic delay diversity prior to precoding at a PRG-level with the precoding matrix.

24. The method of claim 16, wherein the precoding matrix is an $N_t \times R$ matrix, where R is a rank of the transmission, and wherein an R-port DMRS to data signal mapping is an identity matrix of size R.

25. A method of wireless communication at a network node, comprising:
- generating a precoding matrix comprising a number of sub-matrices equal to a number of antenna groups, wherein a first sub-matrix for a first antenna group is the same for each frequency domain resource unit of a frequency domain resource group of K frequency domain resource units, and wherein a phase of each subsequent sub-matrix for each subsequent antenna group is shifted to be orthogonal for each frequency domain resource unit of the frequency domain resource group;
- applying the precoding matrix to both a data signal and a demodulation reference signal (DMRS) of a transmission for each frequency domain resource unit of the frequency domain resource group for non-transparent precoder cycling; and
- transmitting the precoded transmission via the antenna groups.

26. The method of claim 25, wherein the frequency domain resource unit is a resource block (RB) and the frequency domain resource group is a physical resource group (PRG) of K RBs.

27. The method of claim 25, wherein the frequency domain resource unit is a physical resource group (PRG) and the frequency domain resource group is a group of PRGs.

28. The method of claim 27, further comprising precoding the data signal with small delay cyclic delay diversity prior to precoding at a PRG-level with the precoding matrix.

29. The method of claim 25, wherein the precoding matrix is an $N_t \times R$ matrix, where R is a rank of the transmission, and wherein an R-port DMRS to data signal mapping is an identity matrix of size R.

30. The method of claim 25, wherein the transmission is one of a broadcast data transmission, a control channel, a transmission prior to radio resource control connection establishment, or a fallback transmission.

* * * * *